June 9, 1964 C. A. SWANSON 3,136,493
COIL WINDING MACHINE
Original Filed Sept. 8, 1958 5 Sheets-Sheet 1

Inventor
Carl A. Swanson

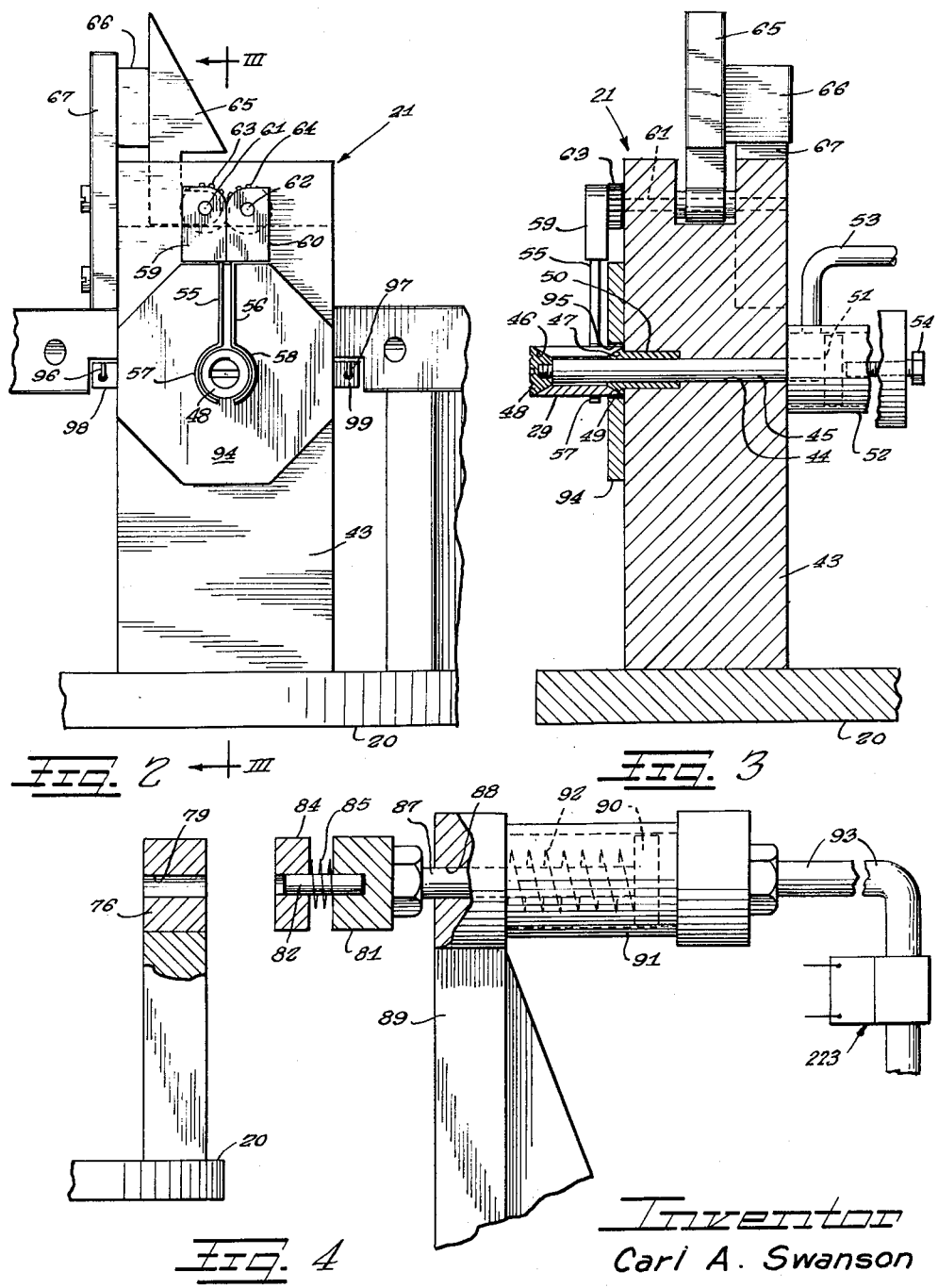

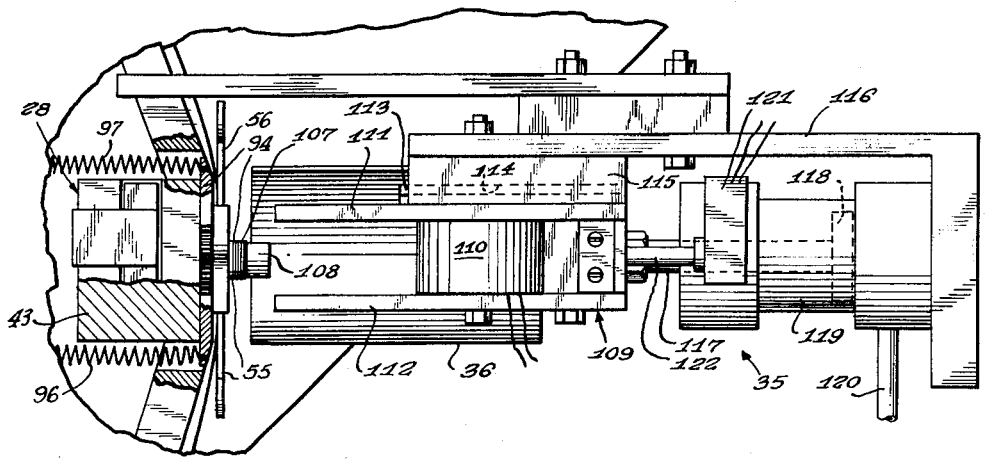
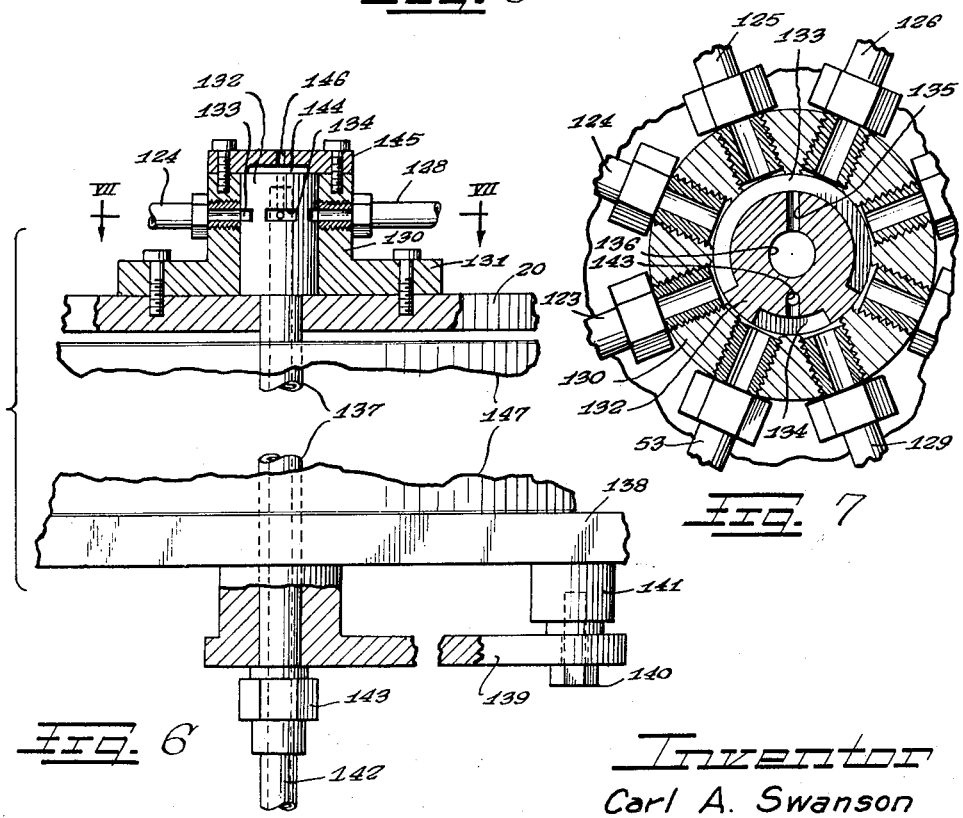

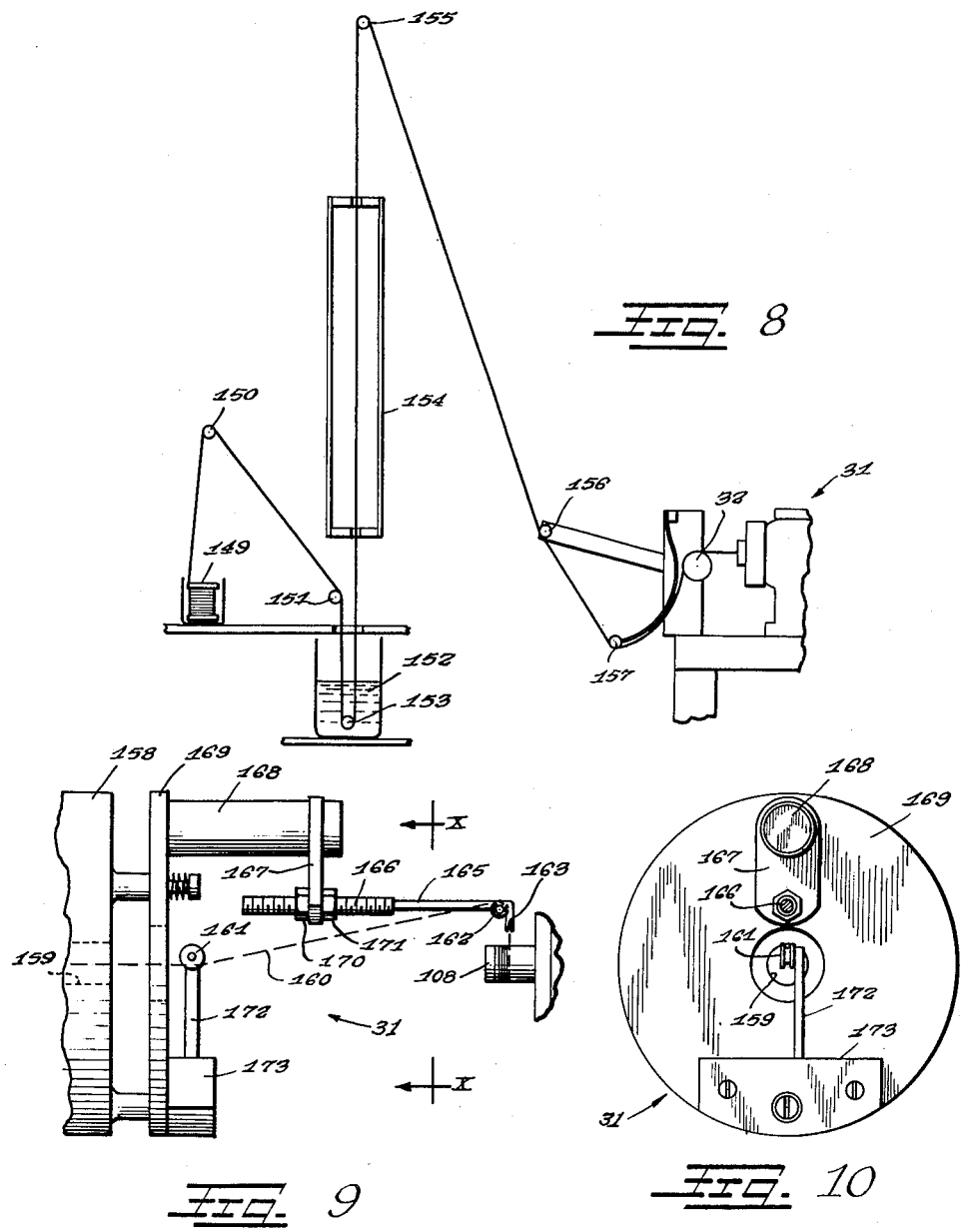

June 9, 1964  C. A. SWANSON  3,136,493
COIL WINDING MACHINE
Original Filed Sept. 8, 1958  5 Sheets-Sheet 5
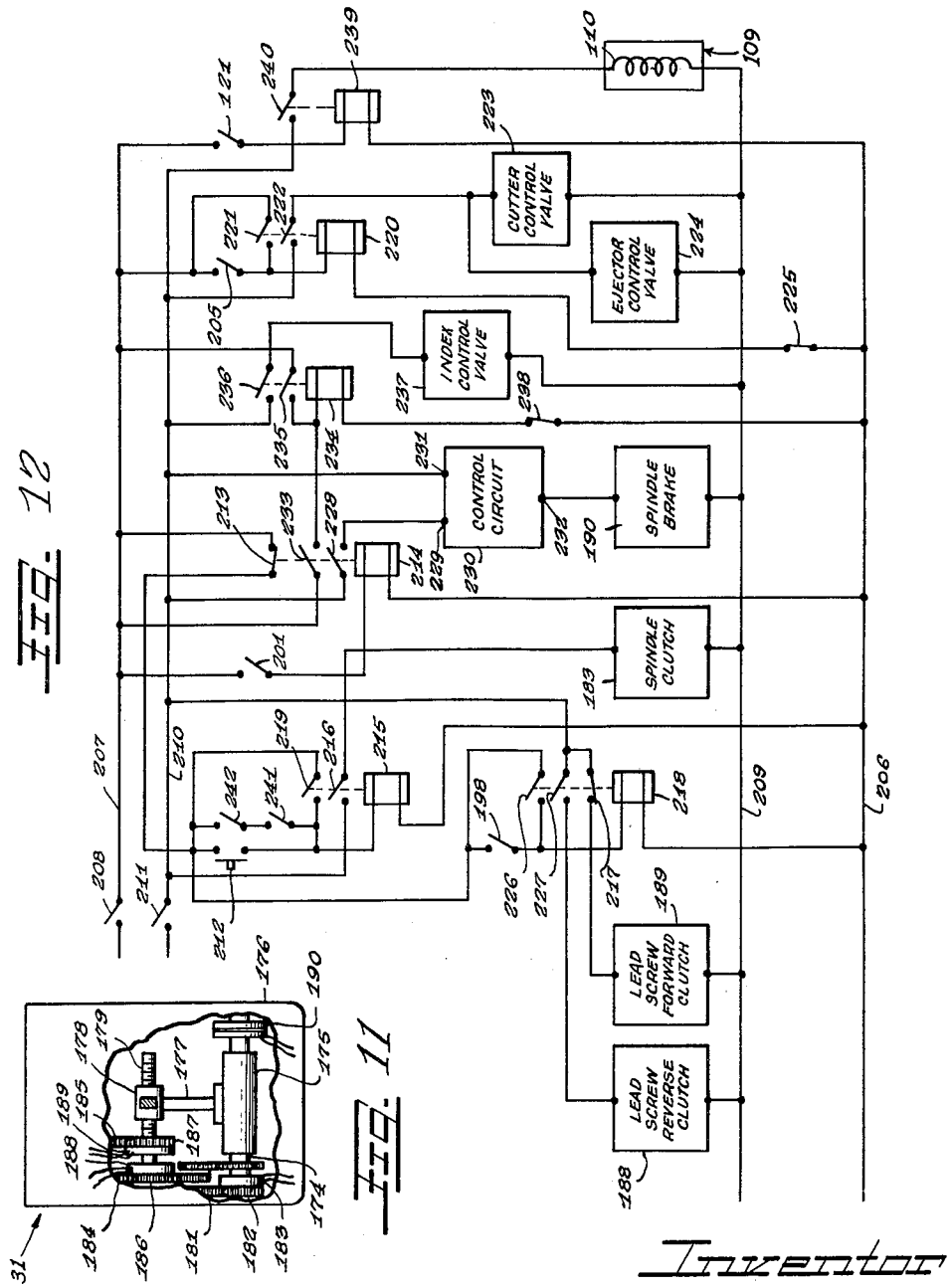
Inventor
Carl A. Swanson

United States Patent Office 3,136,493
Patented June 9, 1964

3,136,493
COIL WINDING MACHINE
Carl A. Swanson, 3638 W. 80th St., Chicago, Ill.
Original application Sept. 8, 1958, Ser. No. 759,546, now Patent No. 3,061,214, dated Oct. 30, 1962. Divided and this application Oct. 29, 1962, Ser. No. 233,851
2 Claims. (Cl. 242—9)

This invention relates to a coil winding machine and more particularly to a precision machine for winding coils to very close tolerances, such as voice coils for speakers. Coil winding machines have heretofore been developed for winding a large variety of different types of coils, some of very complex configurations. However, so far as is known, no machine has heretofore been successfully developed for winding speaker voice coils. Such coils are quite simple, but require an extremely high degree of accuracy to be satisfactory in use. As a result, voice coils have heretofore been wound by hand techniques, requiring skilled personnel and, of course, resulting in considerable expense in the production of the coils.

This is a division of my copending application entitled "Coil Winding Machine," Serial No. 759,546, filed September 8, 1958, now Patent No. 3,061,214, issued October 30, 1962.

It is the primary object of this invention to provide a machine which will automatically wind voice coils or the like with a high degree of accuracy, and in a reliable manner.

In a machine constructed according to this invention, a plurality of coil supports are disposed in equi-angularly spaced relation about the axis of a turntable or turret, and means are provided for periodically rotating the turret through an angle equal to 360° divided by the number of coil supports, to move each coil support from an initial position, then to a coil-winding position, then to a coil-discharge position and then back to the initial position.

According to an important feature of the invention, each of the coil supports comprises a split sleeve arranged to have a paper bobbin wrapped therearound in the initial position, and means provided for expanding each sleeve to a certain diameter during movement from the initial position to the coil-winding position. By the use of the split sleeve, a high degree of accuracy in the diameter of the coil is achieved.

Another feature of the invention is in the provision of a stripper member on the sleeve inside the bobbin, having an internal diameter substantially equal to the external diameter of the sleeve in its expanded condition, the stripper member being movable outwardly to remove a wound coil and bobbin from the sleeve. Thus the sleeve forms a support and guide for the bobbin. It is important that the stripper plate should not ride up over the bobbin and in this connection, the use of the split sleeve is particularly advantageous, because the difference between the expanded and unexpanded diameters of the sleeve may be of the same order of magnitude as the thickness of the paper.

Another feature of the invention is in the provision of a cement coating on the paper of the bobbin, and in the application of a solvent at a position intermediate the initial position and the coil-winding position, with means being provided for drying the cement as each bobbin moves between the coil-winding position and the coil-discharge position.

A further feature is in the application of a cement to the wire, prior to its being wound on the coil, followed by the application of a solvent, and then followed by a drying operation prior to discharge. It is an important feature that the same cement, and solvent, are used for both the wire and paper.

Another feature is in the construction and control of a winding head used to wind wire on the bobbin in the coil-winding position. In accordance with this feature, means are provided for so accurately controlling the movement of the winding head, that it can automatically stop at a position such that the wire can be carried from one bobbin to the next, upon indexing movement of a turret. As a result, the wire feed can be continuous.

A still further feature of the invention is in the provision of means for accurately and reliably cutting the wire, to secure the proper lengths of lead-in conductors.

Still another feature is in the control of the various operations in proper sequence.

This invention contemplates other and more specific objects, features and advantages which will become more fully apparent from the following detailed description taken in conjunction with the accompanying drawings which illustrate a preferred embodiment and in which:

FIGURE 2 is a front elevational view of one of the coil-support assemblies;

FIGURE 3 is a cross-sectional view through the coil assembly of FIGURE 2, taken substantially along line III—III thereof;

FIGURE 4 is an elevational view, partially in section, illustrating the wire-severing assembly;

FIGURE 5 is a top plan view, partly in section, illustrating the coil eject or stripping assembly on an enlarged scale;

FIGURE 6 is a sectional view taken substantially along line VI—VI of FIGURE 1, and illustrating a control valve assembly used to control supply of fluid to the split-sleeve control devices;

FIGURE 7 is a cross-sectional view taken substantially along line VII—VII of FIGURE 6;

FIGURE 8 is a diagrammatic illustration, in elevation, of the feed of wire to the winding head;

FIGURE 9 is an elevational view of the forward portion of the winding head, illustrating how the wire is wound about the bobbin;

FIGURE 10 is a sectional view taken substantially along line X—X of FIGURE 9;

FIGURE 11 is a diagrammatic illustration of the mechanism used to control rotation and axial movement of the winding head; and FIGURE 12 is an electrical circuit diagram, illustrating the automatic control of the various functions performed in the machine.

Figure 1:
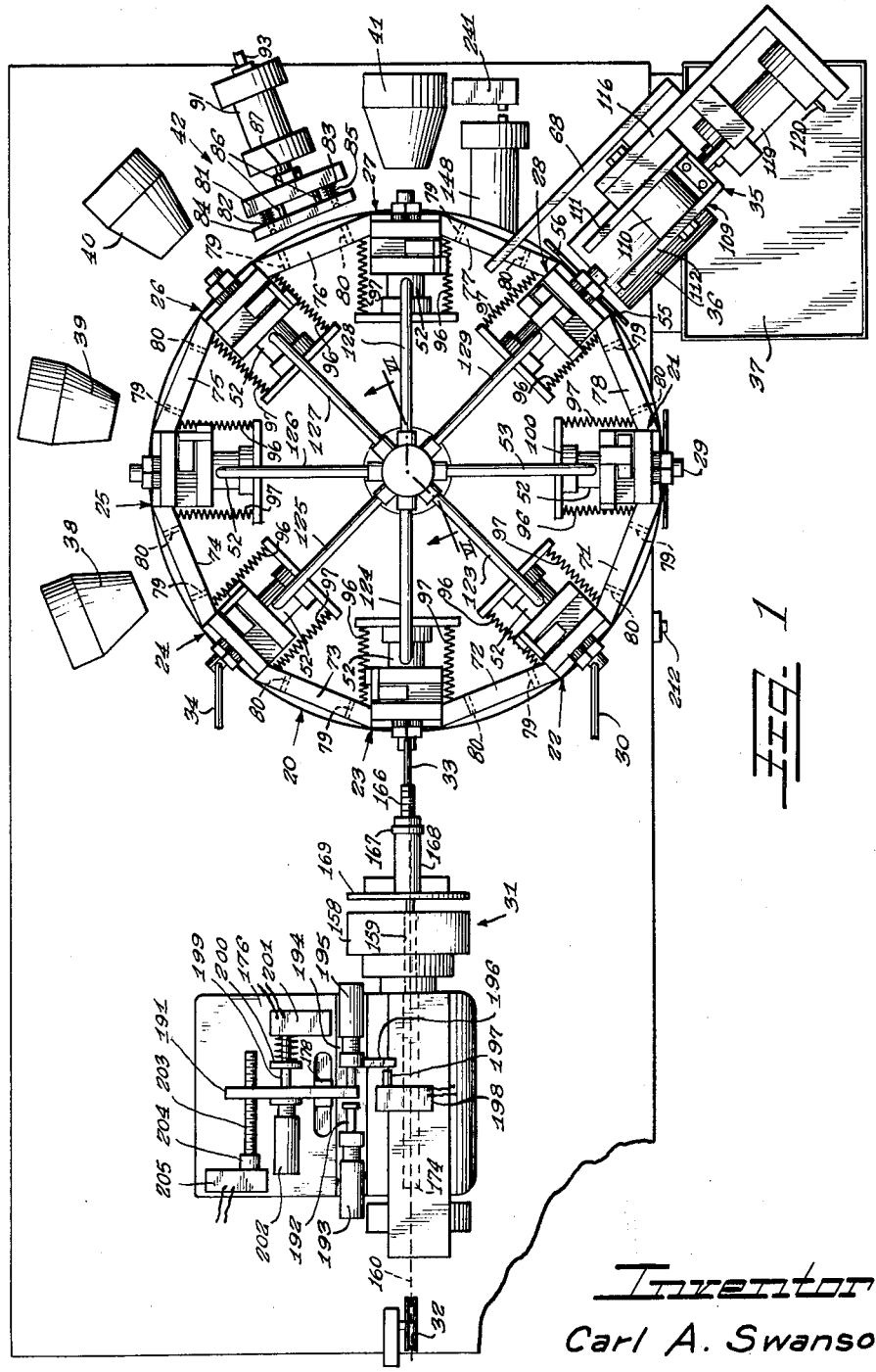
FIGURE 1 is a top plan view of a machine constructed according to the principles of this invention.

Referring to the top plan view of FIGURE 1, reference numeral 20 designates a turntable or turret which carries eight coil-support assemblies 21–28 in equi-angularly spaced relation about the vertical axis thereof. Indexing means are provided for periodically rotating the turret 20 through a 45° angle, i.e., an angle equal to 360° divided by the number of coil supports.

When each coil support reaches an initial position (the position of illustrated support 21), a strip of cement-coated paper is wrapped around a split sleeve 29, which projects radially outwardly.

When each coil support moves from the initial position (the position of support 21) to a second position (the position of support 22), a cement solvent is dripped onto the paper from a tube 30.

At a third position (the position of support 23), a cement-coated wire is wound about the paper bobbin, by means of a winding mechanism generally designated by reference numeral 31. This mechanism will be described in detail hereinafter but, in general, it comprises a hollow spindle rotatable about the axis of the bobbin, the wire being fed from the left, as viewed in FIGURE 1, over a pulley 32, then through the center of the hollow spindle to an arm 33 spaced from the axis of rotation, which winds the wire about the bobbin. The spindle is moved axially as it is rotated, to wind one or more layers on the bobbin. An important feature is that it is stopped at a position such that upon indexing movement of the turret, the wire is stretched from one bobbin to the next, so as to permit continuous feed.

At the fourth position (in the position of coil support 24) additional solvent is dripped onto the bobbin through a tube 34. The devices are sequentially moved through fifth, sixth and seventh positions and then to an eighth position (in the position of support 28 as illustrated in FIGURE 1), at which a mechanism generally indicated by reference numeral 35 is arranged to eject the coil from the sleeve, to fall to a trough 36, and thence to a receiving bin 37.

A plurality of blowers 38, 39, 40 and 41 are arranged to blow heated air against the coil supports, to dry the cement.

An additional feature is in the provision of a wire-cutting mechanism 42, located between the sixth and seventh positions, which functions to sever the wire, and obtain the proper lengths of lead-in conductors.

Coil Support Construction (FIGURES 1–3)

All of the coil supports 21–28 have the same construction, the construction of support 21 being illustrated in FIGURES 2 and 3. As shown, the support 21 comprises an upstanding block 43 fixed to the turret or turntable 20, and having a horizontal bore 44 through which a rod 45 extends.

Disposed on the outer end portion of the rod 45 is the split sleeve 29 which is provided with tapered internal surfaces 46 and 47 adjacent the outer and inner ends thereof, respectively. The surface 46 is engageable by an external tapered surface of a member 48 screwed on the end of rod 45, while the surface 47 is engageable with an external tapered surface of a sleeve member 49 fitted into an enlarged diameter portion 50 of the bore 44. With this arrangement, when the rod 45 is moved inwardly, to the right as viewed in FIGURE 3, the split sleeve 29 will be expanded through the cam engagement of the internal tapered surfaces thereof with the external tapered surfaces of members 48 and 49.

To move the rod 45 inwardly and thus expand the split sleeve 29, the inner end of the rod 45 is attached to a piston 51 movable in an air cylinder 52, to which air is applied through a conduit 53. Thus when compressed air is applied through conduit 53, the piston 51 will be moved inwardly (to the right as viewed in FIGURE 3) to expand the sleeve 29.

The degree of expansion of the sleeve 29, and hence the internal diameter of the wound coil, may be controlled with great accuracy by means of an adjustment screw 54, threaded through the inside end wall of the cylinder 52, to be engageable with the piston 51 when it is moved inwardly.

As described above, a strip of paper is wrapped about the sleeve 29 to form a bobbin. To hold the paper around the sleeve 29, a pair of spring fingers 55, 56 are provided, having semi-circular end portions 57, 58 arranged to engage on opposite sides of the sleeve 29. The fingers 55, 56 are respectively carried by blocks 59, 60, which are carried by shafts 61, 62 journalled on spaced parallel axes by the block 43. The shafts 61, 62 carry gears 63, 64 in mesh with each other, so that both fingers 55, 56 are moved together either inwardly or outwardly from the sleeve 29.

To actuate the fingers 55, 56, an arm 65 is secured to the shaft 61 to project upwardly therefrom, the arm 65 being engaged by the finger of the operator after the strip of paper is wound on the sleeve 29, and being moved in a counterclockwise direction as viewed in FIGURE 2, to engage the portions 57, 58 of the fingers with the paper. The arm 65 is then held in position by a magnet 66 supported by plate 67 from the block 43, the arm 65 being of magnetic material.

As each coil support assembly is moved from the seventh position to the eighth position, the finger-actuating arm thereof is engaged by a fixed member 68 (FIGURE 1), to move it away from the holding magnet and simultaneously move the fingers away from the sleeve.

Wire Severing Mechanism (FIGURES 1 and 4)

The wire-severing mechanism involves the provision of a series of apertured plates 71–78 between the coil supports, plate 71 being fixed between coil supports 21 and 22, plate 72 being fixed between supports 22 and 23, etc. As pointed out above, the wire is arranged to be stretched from one bobbin to the next as the turntable or turret 20 is indexed, to thus permit continuous feed. When the wire is so stretched from one bobbin to the next, it will be stretched across one of the plates 71–78.

At a certain time when the turret is stationary, between indexing movements thereof, the mechanism 42 is actuated to sever the wire which at that time is stretched between the coil supports in the sixth and seventh positions, the plate 76 being illustrated in this position in FIGURE 1.

As shown, the plate 76 (as well as the other plates) has a pair of apertures 79 and 80 across which the wire is stretched, from the bobbin on support 26 to the bobbin on support 27. A member 81 is movable toward and away from plate 76 and carries a pair of pins 82 and 83 arranged to project into the openings 79 and 80, respectively, and thus break the wire at spaced points.

To insure against vertical displacement of the wire out of alignment with the openings 79 and 80, it would prevent proper severing of the wire, a plate 84 is provided having openings receiving the pins 82 and 83 and being urged inwardly away from member 81, by springs 85 disposed on the pins 82, 83. As the member 81 is moved inwardly, the plate 84 initially engages the wire to press it against the outer surface of the plate 76, after which the pins 82, 83 engage the wire and press it into the openings 79, 80, to thus sever the wire at spaced points.

To limit inward movement of the plate 84, as well as to provide additional support therefor, a pair of pins 86 extend through openings in the plate 84 and are secured to the member 81. The pins 86 have head portions (not shown) which limit inward movement of the plate 84.

For actuation of the member 81, it is carried by a rod 87 which extends through an opening 88 in the upper end of an upright support member 89, the outer end of rod 87 being secured to a piston 90 movable in an air cylinder 91, with a spring 92 provided to urge the piston 90 outwardly. Compressed air is admitted into cylinder 91 through a conduit 93 to force the piston 90 inwardly, to thus force the member 81 inwardly, and cause severing of the wire.

It will be appreciated that the positioning of the openings 79, 80 is determined by the length of lead-in wire desired. In some cases, if a large length of lead-in wire is desired, or if the coil supports are close together, a single opening may suffice. Preferably, a series of openings may be provided, and members 81, 84 may likewise be provided with series of openings, so that the positions of the pins 82, 83 may be adjusted, and obtain the proper length of lead-in wire.

Stripper Plate and Coil Ejector Mechanism (FIGURES 2, 3 and 5)

As best shown in FIGURES 2 and 3, a stripper plate 94 is disposed against the outer surface of the upstanding block 43 of the coil support 21, and has a circular opening 95 through which the sleeve 29 extends, the stripper plate being thereby disposed behind or inside a coil wound on the sleeve.

To eject a wound coil from the sleeve 29, the sleeve is first returned to its initial unexpanded condition, and the stripper plate 94 is then moved outwardly to a position adjacent the outer end of the sleeve 29. As indicated above, the coil then falls to chute 36, and thence to a bin 37.

It is important that the opening 95 should have a diameter which is substantially the same as the diameter of the sleeve 29 in its expanded condition, to insure that the edges of the opening do not ride up over the paper bobbin. It is also desirable that the difference between the unexpanded and expanded diameters of the sleeve be of the same order of magnitude as the thickness of the paper of the bobbin, to insure that the stripper plate 94 will engage around a substantial portion of the edge of the bobbin, and also to limit tilting movement of the stripper plate 94.

The stripper plate 94 is urged against the outer surface of the upstanding block 43 by means of a pair of springs 96 and 97 connected to side lugs 98 and 99 on the stripper plate 94, and connected to a bar 100 secured to the inner end of the inner cylinder 52 (see FIGURE 1). Thus after the stripper plate 94 is moved outwardly to eject a wound coil from the sleeve 29, it is automatically returned to the initial position against the block 43.

The stripper plate 94 could, if desired, be manually operated, but the automatic mechanism 35 is preferably utilized. As shown in FIGURE 5, this mechanism operates to remove a coil of wire 107, wound on a bobbin 108, from the sleeve of the coil support assembly 28.

To automatically eject the wound coil, an electro-magnet 109 is provided, including a coil 110 wound on a magnetic core, which extends between pole pieces 111 and 112. The pole piece 111 carries an elongated rib or guide 113 which is disposed in a channel or guide way 114 of a member 115 fixed to an upright support member 116.

The electro-magnet 119 is thus guided for movement inwardly (to the left as viewed in FIGURE 5) to engage the ends of the pole pieces 111 and 112 with portions of the stripper plate 94 on opposite sides of the axis of the wound coil, the stripper plate 94 being of a magnetic material. The electro-magnet is then moved back to an initial position as illustrated in FIGURE 5, and the electro-magnet 109 is then deenergized to allow the stripper plate to return to its initial position.

To move the electro-magnet 109 inwardly and outwardly, it is connected through a rod 117 to a piston 118 movable in an air cylinder 119. Spring means (not shown) may be disposed within the cylinder 119 to urge the piston 118 together with the electro-magnet 109 outwardly. Compressed air may be introduced through a conduit 120 to force the piston 118 and electro-magnet 109 inwardly.

To control energization of the electro-magnet, a micro switch 121 is affixed on the air cylinder 119 and has an actuating member 122 engaged by the electro-magnet 109 in the initial position thereof as illustrated. The electrical circuit will be described in connection with FIGURE 12.

*Supply Valve for Coil Support Air Cylinders (FIGURES 6 and 7)*

As indicated above in connection with FIGURE 3, a conduit 53 is provided for supplying air to the cylinder 52 to thus actuate the rod 45 and expand the split sleeve 29. The construction of all of the coil support devices 21–28 is identical, and conduits 123–129 are respectively connected to the air cylinders of the devices 22–28.

As shown in FIGURES 6 and 7, the inner ends of the conduits 53 and 123–129 are in communication, through suitable coupling devices, with a plurality of circumferentially spaced ports in the wall of a sleeve 130 having an integral flange portion 131 bolted to the upper surface of the turntable or turret 20. Disposed within the sleeve 130 is a fixed valve member 132 having a diameter equal to the inside diameter of the sleeve 130, and having a pair of arcuately extending grooves 133 and 134, adapted to communicate with the ports in the wall of the sleeve 130. The groove 133 communicates through a passage 135 with a central opening 136 in the valve member 132 the opening 136 being an extension of a central opening of a shaft 137 to which the valve member 132 is integrally secured. The shaft 137 is fixedly carried from a base plate 138, although its angular position may be adjusted, to adjust the singular position of valve member 132, by movement of an arm 139. A screw 140 extends through an arcuate slot in the arm 139 and into a depending boss 141 of the base plate 138, to fix the position of the arm 139, and thus the angular position of the valve member 132, after the desired position has been found.

A conduit 142 is connected by a coupling 143 to the lower end of the shaft 137, to supply compressed air thereto. The air flows upwardly into the central opening 136 of the valve member 132, thence through passage 135 to the arcuate groove 133, in communication with the conduits 123—128 thus the split-sleeves of the coil support devices in the second, third, fourth, fifth, sixth and seventh positions are expanded.

The conduits 53 and 129, from the coil support devices in the first and eighth positions, communicate with the groove 134, which communicates through an upwardly extending passage 143 with a chamber 144 defined at the upper end of the valve member 132, by a cap 145 secured to the upper end of the sleeve 130. The cap 145 has a port 146 which vents the chamber 144 to atmosphere. Accordingly, the conduits from the coil-support devices in the first and eighth positions are vented to the atmosphere, and the split-sleeves thereof will be in their unexpanded conditions.

It may here be noted that an indexing mechanism is disposed in a housing 147 between the lower side of the turntable 20 and the upper side of the base plate 138. This may be of a standard type, operated by an air cylinder 148 (FIGURE 1), and is not described and illustrated in detail.

*Wire Feed to Winding Mechanism (FIGURE 8)*

The wire is fed from a supply spool 149, thence upwardly over a pulley 150 thence downwardly and over a pulley 151 and into a cement tank 152, thence around the pulley 153 in the tank 152, and upwardly through a dryer 154, thence over a pulley 155, and downwardly past a pulley 156, and thence over the pulley 32 and into the hollow spindle of the winding mechanism. A spring or gravity urged pulley 157 engages the wire between pulleys 156 and 32, to maintain proper tension.

*Winding Head Construction (FIGURES 9 and 10)*

The winding head comprises a circular plate 158 carried by the hollow spindle of the winding mechanism and having a central opening 159 in alignment with the center of the spindle, through which the wire extends, the wire being indicated by reference numeral 160 in FIGURE 9. The wire 160 extends against and past a guide pulley 161 and thence angularly outwardly, with respect to the axis of rotation, to a guide 162 which may preferably be a rotatable pulley. From the pulley 162, the wire extends inwardly through the groove of grooved guide element 163, and thence to a bobbin 164 on the coil support device in the third or coil-winding position.

It will be appreciated that as the winding head is rotated about its axis, the wire will be wound about the bobbin 164. As will be described, the winding head is moved axially at the same time that it is rotated, to wind one or more layers of wire on the bobbin.

The grooved guide element 163 is preferably formed of a resilient material such as piano wire, and may be adjusted by moving the spaced portions thereof toward or away from each other, to obtain a certain degree of friction opposing withdrawal of the wire, and to thus obtain proper tensioning of the wire in the winding operation and to permit stretching of the wire from one bobbin to another upon indexing movement of the turret.

It is important to obtain exactly the right amount of friction at this point, the exit point from the winder. At the same time, it is found to be important to eliminate friction at other points, as is accomplished through the guides 161 and 162, to insure uniform winding tension by minimizing erratic feed to the exit point from the winding head.

The grooved guide element 163 and also the pulley 162 are supported through a rod 165 secured to a threaded shaft 166 which extends through a plate 167 carried on a stud 168 which extends axially from a plate 169, supported from the plate 158. Nuts 170 and 171 are threaded on the shaft 165 to allow adjustment of its axial position, and thus to allow adjustment of the axial position of the guide element 163.

The pulley 161 is supported on an arm 172, which is secured to the plate 169 through a block 173, preferably in a manner to allow adjustment of the position of the pulley 161.

Winding Head Drive Mechanism (FIGURE 11)

The circular plate or block 158 of the winding head is carried by a hollow spindle indicated by reference numeral 174 in the diagrammatic illustration of FIGURE 11. The spindle 174 is journalled in a sleeve 175 in a manner such that the spindle 174 may freely rotate in the sleeve 175, but relative axial movement is not permitted. The sleeve 175 is journalled in a housing 176 of the winding mechanism in a manner such that it can move axially to thus move the spindle axially.

The sleeve 175 is rigidly connected through an arm 177 to a follower 178 which receives a lead screw 179, so that upon rotation of the lead screw, the sleeve 175 together with the spindle 174 will be moved axially.

A gear train and drive motor (not shown) are disposed within the housing 176 of the winding mechanism. The gear train includes a gear 181 meshed with a gear 182 which is freely rotatable on the spindle 174, and which is mechanically coupled to one member of an electrically controlled clutch device 183, the other member of the clutch device 183 being connected to the spindle 174. Upon energization of the device 183, the gear 182 is rigidly coupled to the spindle 174.

The mechanism further includes a pair of gears 184 and 185 driven from the spindle 174 and rotated in opposite directions. Gears 184 and 185 are respectively meshed with gears 186 and 187 freely rotatable on the lead screw axis, but arranged to be mechanically coupled thereto through electrically controlled clutch devices 188 and 189. Thus upon energization of the device 188, the lead screw 179 will be rotated in one direction, to move the spindle in one axial direction, while energization of the device 188 will result in reverse movement.

An electrically controlled brake device 190 is also provided, to stop rotation of the spindle 174. It will be appreciated that a spline connection must be provided between device 190 and the spindle 174, as well as between device 183 and spindle 174, to permit axial movement of the spindle 174.

Control Switch Assembly on Winding Head (FIGURE 1)

The follower 178 carries a bar 191 on the top side of the winding mechanism housing 176, the bar 191 being thus rigidly connected to the sleeve 175, to move axially with the spindle 174 and the winding head.

When a coil-winding operation is completed, the mechanism will be in a position as illustrated, with the winding head being at the limit of its movement inwardly toward the axis of the turret. The clutches 183 and 188 are then energized to cause the winding head to rotate and at the same time to move outwardly, to the left as viewed in FIGURE 1. As the limit of the outward movement is approached, the bar 191 engages a stop member 192 which is carried through an adjustment device 193 from a slide 194 mounted on the housing 176 for movement in a direction parallel to the winding head axis. The slide 194 carries another adjustment device 195 which carries an arm 196 arranged to engage the actuator 197 of a micro-switch 198. Thus when a predetermined position is reached in the outward movement of the winding head, the switch 198 will be actuated. This position is, of course, determined by the positions of adjustment of the devices 193 and 195.

When the micro-switch 198 is actuated, it causes energization of the clutch 189, to reverse the direction of rotation of the lead screw 179 and to cause the winding head to move inwardly, to the right as viewed in FIGURE 1. When the initial position is reached, a pin 199 engages an actuator button 200 of a micro-switch 201 which controls clutch 183 and brake 190 in a manner to stop rotation of the winding head. The position of pin 199 is adjustable by an adjustment device 202.

The wire-cutting mechanism, and also the eject mechanism, are actuated at times when the turret or turntable 20 must be stationary. In accordance with this invention, they are actuated as the winding head approaches the limit of its outward movement. In particular, a shaft 203 is threaded into the bar 191 and carries a member 204 movable into a micro-switch 205, to actuate the same during outward movement of the bar 191. The micro-switch 205 is connected in circuit with devices used to control the cutter mechanism 42 and the eject mechanism 35, to actuate the same.

Control Circuit (FIGURE 12)

A pair of lines 206 and 207 are arranged to be connected to a suitable control voltage source, preferably low voltage source, an on-off switch 208 being preferably provided in the line 207. Another pair of lines 209 and 210 are arranged to be connected to another voltage source, preferably a higher voltage direct current source, an on-off switch 211 being provided in the line 210.

To initiate operation of the machine, the switches 208 and 211 are closed, and the push button switch 212 is depressed. As shown in FIGURE 1, this switch may be located on the front part of the machine, adjacent the first or initial coil support device position. Switch 212 is connected to line 207 through a normally closed contact 213 of a relay 214, and through a relay 215 to the line 206, to thus energize relay 215. When relay 215 is energized, the spindle clutch 183 is connected through contact 216 between lines 209 and 210 so that the winding head will be rotated. At the same time, the lead screw forward clutch 189 is connected between lines 209 and 210, through a normally closed contact 217 of a relay 218, so that the winding head will be moved axially outwardly, to thus wind a layer of wire on the bobbin. The holding contact 219 of the relay 215 is closed upon energization of the relay, to maintain energization thereof.

When the winding head approaches the limit of its outward movement, the switch 205 is closed to connect a relay 220 between lines 206 and 207. A holding contact 221 is closed to maintain energization of the relay 220 and a second contact 222 is closed to connect a control solenoid of a cutter control valve 223 and a control solenoid of an ejector control valve 224 between lines 209 and 210. Thus compressed air is supplied to conduits 93 and 120 to cause actuation of the cutter and ejector mechanisms. One of the mechanisms, such as the ejector mechanism, may operate slower than the other, and a micro-switch 225 may be operated at the limit of the power stroke thereof, to break the circuit to relay 220, and deenergize the actuators of valves 223 and 224, so as to allow return movement of the mechanisms.

When the winding head reaches the limit of its outward movement, micro-switch 198 is closed to connect the relay 218 between the lines 206 and 207. A holding contact 226 is then closed to maintain energization of the relay 218. A contact 227 is closed to energize the lead screw reverse clutch, to thus cause the winding head to move inwardly, while the contact 217 is opened to deenergize the lead screw forward clutch 189.

When the winding head reaches the limit of its inward movement, the micro-switch 201 is closed to energize the relay 214 which is of a time delay type such that the contacts thereof are actuated when it is energized, but are returned to their initial condition after a certain time interval. Upon energization of relay 214, the contact 213 is opened, to deenergize both the relays 215 and 218. At the same time, a contact 228 is closed to connect a terminal 229 of a control circuit 230 to the line 210. The control circuit 230 has a second terminal 231 connected directly to the line 210, and a third terminal 232 connected to the spindle brake 190, the other side of the brake being connected to the line 209. The control circuit 230 may preferably include a Thyratron arranged to conduct a large current through the spindle brake 190, upon application of the voltage to the terminal 229, thus to rapidly stop rotation of the spindle.

A third contact 233 on the relay 214 is arranged to connect a relay 234 between lines 206 and 207. A holding contact 235 is closed to maintain energization of the relay 234, and a second contact 236 is closed to connect an index control valve 237 between lines 209 and 210. Control valve 237 controls supply of air to the cylinder 148 of the indexing mechanism, which causes the turntable or turret 20 to move through a 45° angle. At the end of the power stroke of the index mechanism a micro-switch 238 is opened, to deenergize the relay 234, and close the index control valve 237, to allow the mechanism to return to its initial condition.

The machine is now in its initial position, except, of course, that coil has been wound, and the turret has been shifted in position to permit winding of another coil when the winding mechanism is again operated.

It should be noted that the micro-switch 121 of the ejector mechanism connects a relay 239 between lines 206 and 207, to close a contact 240, and connect the electro-magnet 110 between the lines 209 and 210. The switch 121 is closed whenever the electro-magnet is moved inwardly.

To initiate another cycle of operation, it is necessary that the operator again depress button 212. In general, this is desirable since it allows the operator to take time to check the operation of the machine and make sure that everything is satisfactory, before initiating another cycle. However, if desired, the operation of the machine may be made continuous by utilizing a micro-switch 241 which is closed at the end of the return movement of the indexing mechanism. Switch 241 is connected through a control switch 242 in parallel with the push button switch 212. Accordingly, when switch 242 is closed, the operation of the machine will be continuous.

It should be emphasized that it is highly important that the winding head be stopped in a position such that the wire can be carried from one bobbin to the next upon indexing movement of the turret. The use of the brake 190 is of considerable importance in this respect, and it is also important that great care be exercised in the adjustment of the position of operation of the micro-switch 201.

It will be understood that modifications and variations may be effected without departing from the spirit and scope of the novel concepts of this invention.

I claim as my invention:

1. In a coil-winding machine, a support member, a sleeve on said support member arranged to have a paper bobbin wrapped thereon, means for expanding said sleeve to a predetermined diameter, means for automatically winding wire on said bobbin while said sleeve is expanded, means for thereafter returning said sleeve to its initial unexpanded condition, a stripper member of magnetic material on said sleeve inside the bobbin and having an internal diameter substantially equal to the external diameter of said sleeve in its expanded condition, a magnet having pole means arranged to engage said stripper member, means for moving said magnet outwardly in the direction of the axis of said sleeve to remove a wound coil and bobbin from said sleeve.

2. In a coil-winding machine, a support member, a sleeve on said support member arranged to have a paper bobbin wrapped thereon, means for expanding said sleeve to a predetermined diameter, means for automatically winding wire on said bobbin while said sleeve is expanded, means for thereafter returning said sleeve to its initial unexpanded condition, a stripper member of magnetic material on said sleeve inside the bobbin and having an internal diameter substantially equal to the external diameter of said sleeve in its expanded condition, an electro-magnet having a pair of poles arranged to engage said stripper member at points on opposite sides of the axis of said sleeve, means for moving said electro-magnet outwardly in the direction of the axis of said sleeve to remove a wound coil and bobbin from said sleeve, and means for then deenergizing said electro-magnet to permit return of said stripper member to its initial position.

References Cited in the file of this patent

UNITED STATES PATENTS

| | | |
|---|---|---|
| 1,167,722 | Scott | Jan. 11, 1916 |
| 1,907,896 | Summey | May 9, 1933 |
| 1,970,934 | Haegele et al. | Aug. 21, 1934 |
| 1,977,668 | Dallas | Oct. 23, 1934 |
| 2,198,644 | Wettengel | Apr. 30, 1940 |
| 2,782,809 | Smalbridge | Feb. 26, 1957 |